Dec. 4, 1928.
J. I. HULL
1,694,322
SPEED CONTROL SYSTEM
Original Filed Feb. 17, 1927
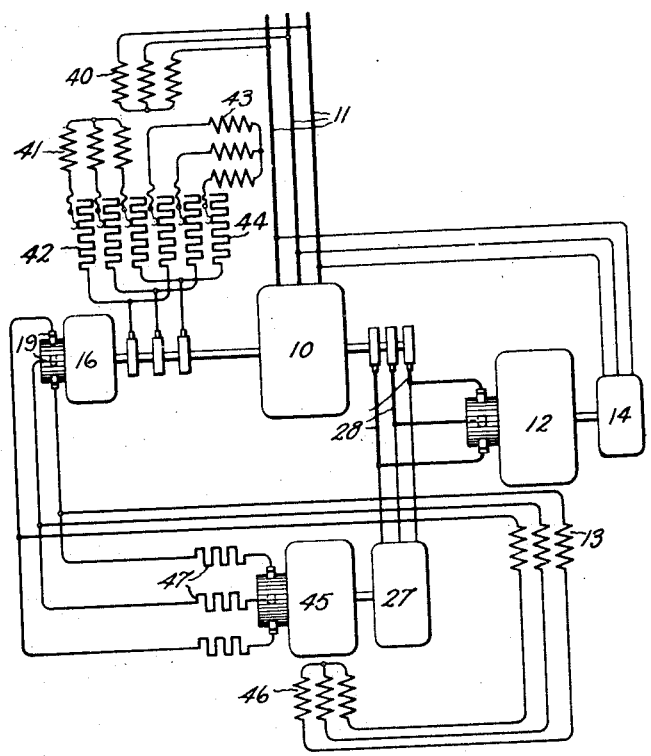
Inventor:
John I. Hull
by Alexander S. Lentz
His Attorney Patented Dec. 4, 1928.

1,694,322

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

SPEED-CONTROL SYSTEM.

Original application filed February 17, 1927, Serial No. 169,074. Divided and this application filed November 23, 1927. Serial No. 235,368.

My invention relates to speed control systems for induction motors and has for its object the provision of an improved arrangement for controlling the excitation of a commutator machine which is concatenated with an induction motor for the purpose of controlling its speed.

The theory of the control of the speed of induction motors by means of polyphase commutator regulating machines of the well-known Scherbius type in which the rotor is provided with a commutated winding and the stator with a neutralizing winding and an independent exciting winding has been pointed out in my United States Patent 1,306,594, assigned to the same assignee as the present invention. It is shown therein that this ideal regulation requires the injection into the independent exciting winding of the regulating machine of one component of voltage independent of slip frequency for the purpose of balancing the resistance drop in said exciting winding and a second component of voltage varying in approximate proportion to the slip frequency for the purpose of balancing the inductive drop. The present application, which is a division of my application Serial No. 169,074 filed February 17, 1927, relates to improvements in the means for accomplishing such regulation in accordance with these conditions.

In carrying my invention into effect I prefer to make use of a commutator exciting machine which is driven at a speed directly proportional to the slip frequency, the speed being zero at zero slip, for supplying the inductive drop excitation. This machine always operates at its synchronous speed or approximately its synchronous speed and consequently the flow of current in its armature winding is always direct current or an alternating current of very low frequency which gives the advantage of a negligible reactance drop in the armature. The rotor and stator windings then function as the primary and secondary windings of a transformer, the transformation ratio of which is directly proportional to the speed of rotation. This supplies the voltage necessary for supplying the inductive drop in the exciting circuit of the main regulating machine and other means are provided for supplying the additional excitation component required for the correct regulation of the speed of the induction motor.

Referring to the drawing, 10 represents the main induction motor supplied from source 11. The secondary circuit 28 of the main motor is connected to the commutator brushes of the regulating machine 12 which machine is driven by the motor 14 floating on line 11. The field 13 of the regulating machine has one end connected to the frequency changer 16 which is driven by the main motor. The frequency converter which might, if desired, be supplied by an auxiliary synchronous generator is shown supplied from line 11 through suitable regulating resistances and a transformer. The primary of this transformer is shown at 40. 41 comprises a secondary winding of this transformer which is connected to the frequency converter 16 through adjustable resistances 42 to supply the excitation necessary for overcoming the resistance drop in the circuit of the field winding 13. A further secondary transformer winding 43 arranged in quadrature relation with winding 41, together with adjustable resistances 44, may be provided if desired to supply a voltage to the frequency converter for adjusting the power factor of motor 10. Machine 45 has a distributed polyphase stator winding 46, similar to that of an induction motor, connected in the field circuit 13 and an armature similar to that of a direct current machine connected through polyphase brushes and a calibrating resistance 47 to the commutator end of the frequency converter 16. This machine 45 is driven by the motor 27 from the secondary circuit 28 of the main motor. Machines 27 and 45 will have the same number of poles and accordingly machine 45 is driven at a synchronous speed corresponding to the slip frequency of the main motor 10. The frequency obtained at the commutator end of the frequency converter 16 is exactly equal to the slip frequency of 10. If 27 is a synchronous motor, machine 45 will run at exactly its own synchronous speed and at approximately synchronous speed if 27 is an induction motor. In the first case mentioned there is no voltage induced in the rotor winding of 45 and in the second case but a very slight voltage, so that the current which flows in the armature of 45 through the calibrating resistance 47 may be assumed to be proportional to the terminal voltage of 16. The resistance 47 does not constitute a part of the regulation but is merely a means of calibrating the machine 45. At synchronous speed of motor 10 the set 27, 45 is of course stationary and the currents in the circuits supplied by the frequency converter 16 are direct currents. Under this condition no voltage is induced in winding 46. The current flowing in field winding 13 will be proportional to the voltage of 16.

The calibrating resistance 47 is designed and adjusted to give an armature current for machine 45 of such a magnitude that whenever the slip becomes anything else than zero, this armature current, acting as the primary current of a transformer, will induce in the winding 46, acting as the secondary of a transformer, a voltage for supplying the inductive drop in the field circuit 13; that is, the voltage induced by the alternations of the flux in 13 is balanced by the voltage induced by the alternations of the flux in 46. This condition once obtained will hold for all variations in the slip frequency of the motor 10. Thus, the resistance drop in circuit 13 is balanced by the proper setting of the resistance 42 and the inductive drop is balanced by the machine 45, 46, which supplies a voltage which is proportional to the slip frequency.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:

1. A speed control system for induction motors comprising, in combination with such a motor, a regulating machine concatenated with said motor, a field winding for said regulating machine, a dynamo-electric machine for balancing the inductive drop of said field winding having a commutated armature winding and a distributed alternating current stator winding, the latter being connected to supply the field winding of said regulating machine, means for driving said dynamo-electric machine at its own synchronous speed and means for supplying a low voltage current to the commutator of said dynamo-electric machine at the slip frequency of said induction motor.

2. A regulating system for induction machines comprising, in combination with such a machine, a commutator regulating machine concatenated with the induction machine, a field winding for said regulating machine, a dynamo-electric machine for balancing the inductive drop of said field winding having a commutated armature winding and a distributed alternating current stator winding, the latter being connected to supply the field winding of said regulating machine, means for driving said dynamo-electric machine at substantially its own synchronous speed, and common means for supplying a low voltage current to the commutator of said dynamo-electric machine at the secondary frequency of said induction machine and for supplying the field winding of said regulating machine with a voltage for overcoming the resistance drop therein.

3. In an induction motor regulating system, an induction motor, apparatus for supplying an exciting voltage proportional to the secondary frequency of the induction motor comprising a dynamo-electric machine having a commutated armature winding and a distributed alternating current stator winding, stationary brushes for said commutated winding, means for driving said machine at a speed directly proportional to the secondary frequency of the induction machine, and means for supplying the brushes of said machine at a substantially constant voltage and a frequency that varies directly as the slip frequency of said induction machine.

4. An induction motor regulating system comprising an induction motor of the wound secondary type, a commutator regulating machine concatenated therewith, an exciting winding for said regulating machine and means for supplying excitation to said winding comprising a frequency changer for supplying a frequency equal to the slip frequency of said motor, a dynamo-electric machine having a commutated winding supplied from said frequency changer and a distributed alternating current stator winding supplying said exciting winding and means for driving said dynamo-electric machine at a speed directly proportional to the slip frequency of said induction motor.

In witness whereof, I have hereunto set my hand this 21st day of November, 1927.

JOHN I. HULL.